(12) United States Patent
Brunson et al.

(10) Patent No.: US 7,123,111 B2
(45) Date of Patent: Oct. 17, 2006

(54) MICRO-ELECTROMECHANICAL SYSTEMS

(75) Inventors: Kevin M Brunson, Malvern (GB);
David J Hamilton, Malvern (GB);
David O King, Malvern (GB); Mark E McNie, Malvern (GB)

(73) Assignee: QinetiQ Limited, London (GB)

( * ) Notice: Subject to any disclaimer, the term of this patent is extended or adjusted under 35 U.S.C. 154(b) by 0 days.

(21) Appl. No.: 10/507,113

(22) PCT Filed: Mar. 19, 2003

(86) PCT No.: PCT/EP03/50073

§ 371 (c)(1),
(2), (4) Date: Sep. 10, 2004

(87) PCT Pub. No.: WO03/078302

PCT Pub. Date: Sep. 25, 2003

(65) Prior Publication Data

US 2005/0104675 A1    May 19, 2005

(30) Foreign Application Priority Data

Mar. 20, 2002    (GB) ................................ 0206510.0

(51) Int. Cl.
*H03B 5/32*    (2006.01)
*G01P 15/08*    (2006.01)

(52) U.S. Cl. ................. 331/116 M; 331/154; 331/155; 331/163; 73/504.12; 73/504.13

(58) Field of Classification Search ................ 331/155, 331/154, 116 R, 116 M
See application file for complete search history.

(56) References Cited

U.S. PATENT DOCUMENTS

| | | | |
|---|---|---|---|
| 4,587,853 A | 5/1986 | Komoto et al. | |
| 5,561,400 A | 10/1996 | Iguchi et al. | ................ 331/163 |
| 5,587,529 A | 12/1996 | Iguchi et al. | ............ 73/504.13 |
| 5,672,949 A | 9/1997 | Ward | .......................... 318/609 |
| 5,731,519 A | 3/1998 | Ogawa | .................... 73/504.12 |

FOREIGN PATENT DOCUMENTS

EP    0 161 777    11/1985

(Continued)

OTHER PUBLICATIONS

Ayazi et al; "A Harpss Polysilicon Vibrating Ring Gyroscope"; Journal of Microelectromechanical Systems, IEEE Inc. New York, US, vol. 10, No. 2, Jun. 2001, pp. 169-179, XP001123587.

(Continued)

*Primary Examiner*—Joseph Chang
(74) *Attorney, Agent, or Firm*—Nixon & Vanderhye P.C.

(57) ABSTRACT

A micro-electromechanical system (MEMS) comprises a substrate incorporating an oscillatory ring, forcing electrodes for driving the ring into resonance, and sensing electrodes providing an electrical output signal dependent on oscillation of the ring as a result of such forcing and any externally applied force. A positive feedback circuit is provided for feeding back a signal dependent on the output signal of the sensing electrodes to the forcing electrodes in order to sustain oscillation of the ring. The use of positive feedback to drive the forcing electrodes in order to sustain oscillation of the ring is highly advantageous in such an application since it produces a system which exhibits very low phase noise of a magnitude considerably less than the phase noise experienced in use of a phase-lock loop circuit to sustain oscillation.

23 Claims, 2 Drawing Sheets

FOREIGN PATENT DOCUMENTS

| | | |
|---|---|---|
| EP | 1 152 216 A | 11/2001 |
| GB | 2 154 739 | 9/1985 |
| GB | 2 235 773 | 3/1991 |
| GB | 2 338 781 | 12/1999 |

OTHER PUBLICATIONS

Sung et al; "Development of a Tunable Resonant Accelerometer with Self-Sustained Oscillation Loop"; Proceedings of the IEEE 2000 National Aerospace and Electronics Conference, Naecon 2000, Engineering Tomorrow (CAT. No. 00CH37093), Dayton, 2000, Piscataway, NJ, USA, IEEE, USA, pp. 354-361, XP001156567.

Burrer et al; "High-Precision Besoi-Based Resonant Accelerometer"; Sensors and Actuators A, Elsevier Sequoia S.A., Lausanne, CH, vol. 50, No. 1-2, Aug. 1995, pp. 7-12, XP004303507.

MICRO-ELECTROMECHANICAL SYSTEMS

This application is the US national phase of international application PCT/EP03/50073, filed 19 Mar. 2003, which designated the US and claims priority to GB Application No. 0206510.0 filed 20 Mar. 2002. The entire contents of these applications are incorporated herein by reference.

This invention relates to micro-electromechanical systems (MEMS), and is concerned more particularly, but not exclusively, with self-resonant oscillatory MEMS gyrometer systems.

In this specification the term "micro-electromechanical systems (MEMS)" is used to encompass a wide range of micromechanical sensors and actuators including those described in the art by the terms "microsystems technology (MST)", "microrobotics" and "microengineered devices".

WO 00/16041 discloses a oscillatory MEMS ring gyrometer which measures rate of turn and has applications in the fields of vehicle control, smart munitions, robotics, virtual reality, leisure and medicine as well as other fields.

The primary mechanical system of an oscillatory MEMS ring gyrometer is typically stimulated by one or more forcers at the resonant frequency of one of its modes so that it oscillates with constant amplitude. When the gyrometer is rotated about its centre, the resulting rate-dependent coupling force due to the Coriolis effect excites the secondary mechanical system at this frequency. In the case of multi-axis devices there may be tertiary and quaternary mechanical systems, but, for the sake of simplicity, the following discussion will be limited to a single axis gyrometer. In the case of a ring gyrometer, the independent mechanical systems may co-exist on the same structure.

If the two mechanical systems are tuned such that their resonant frequencies are close, the response of the secondary mechanical system to the coupling force is amplified by its associated resonant response factor at that frequency. Where the frequency of the two mechanical systems is closely matched, this resonant response factor corresponds to the Q factor of the resonant system. In a single-axis ring gyrometer, this typically corresponds to elliptical modes of the structure, i.e. $2\theta$ (in a three-axis ring gyrometer there are typically two $2\theta$ and two $3\theta$ modes, as disclosed by B. J. Gallacher, J S. Burdess, A. J. Harris, M. E. McNie "The Principles of a Multi-Axis Vibrating Gyroscope", IEEE Trans. Aerospace and Electronic Systems, Volume 37, October 2001, pp. 1333–1343). The signal obtained by sensing the resulting oscillation of the secondary mechanical system is equivalent to the output of an ideal balanced modulator. The amplitude modulated suppressed carrier signal is demodulated to obtain the analogue for the rate of rotation of the ring gyrometer structure about its centre.

The balanced modulator realised by this structure is essentially mechanical, and the electrical analogue of its output must be obtained by sensing the oscillation of the secondary mechanical system by means of an appropriate sensor, for example a capacitive sensor. The carrier signal required to synchronisely demodulate this signal can be recovered by sensing oscillation of the primary mechanical system, this requiring that the signal is multiplied by a copy of the carrier signal that is used to generate it. A low pass filter is then used to select the base-band signal component required. Thus the gain of the synchronous demodulator is proportional to the cosine of the difference between the phase of the carrier signal used to generate its input signal and the phase of the carrier signal supplied to it. The phase of the carrier signal supplied can be adjusted to maximise the gain magnitude. However it is vital that temporal variation in this phase difference is minimised, since this can result in amplitude modulation of the base-band signal recovered.

The primary mechanical system may be stimulated by applying an alternating radial force at one or more points around the circumference of the suspended ring, electrostatic forces commonly being utilised in surface machined MEMS structures to perform this function. However the primary mechanical system can be stimulated to oscillate in a variety of modes, and it is necessary to ensure that the primary mechanical system oscillates in the desired mode (typically $2\theta$ or $3\theta$ in the case of a single axis ring gyroscope). This can be achieved by driving the forcers at precisely the right frequency in which case the oscillator employed to provide the forcer drive signal must be extremely stable because the primary mechanical system is characterised by a high Q factor.

It is common practice to use a voltage-controlled oscillator to provide the forcer drive signal. The frequency of this oscillator is first adjusted to locate the resonant frequency of the mode required (typically $2\theta$ or $3\theta$). Once this has been done, the voltage-controlled oscillator is phase-locked to the output of the circuit that is used to sense oscillation of the primary mechanical system. The high Q factor of the primary mechanical system ensures that the frequency of this oscillator is stable and tracks any change in its resonant frequency. However phase-lock loop circuits introduce unwelcome phase noise because they must constantly hunt for the optimum frequency and their loop gain is finite. This phase noise results in amplitude modulation of the signal providing an analogue of the rate of rotation of the ring gyrometer about its centre.

It is an object of the invention to provide a MEMS providing an output which is less susceptible to phase noise.

According to one aspect of the present invention there is provided a micro-electromechanical system (MEMS) comprising a substrate incorporating an oscillatory member, forcing means for driving the oscillatory member into resonance, and electrical sensing means providing an electrical output signal dependent on oscillation of the oscillatory member as a result of such forcing and any externally applied force, wherein a positive feedback circuit is provided for feeding back a signal dependent on the output signal of the sensing means to the forcing means in order to sustain oscillation of the oscillatory member.

The use of positive feedback to drive the forcing means in order to sustain oscillation of the oscillatory member is highly advantageous in such an application since it produces a system which exhibits very low phase noise of a magnitude considerably less than the phase noise experienced in use of a phase-lock loop circuit to sustain oscillation.

This is because resonant systems have a natural tendency to oscillate at their resonant frequency as a result of the fact that the energy transferred between the two competing energy storage mechanisms involved is thereby maximised. Thus, when oscillation is sustained by positive feedback, the system has a tendency to preferentially oscillate at its natural frequency. The use of an external oscillator to drive the system at a particular frequency does not allow this to happen. Furthermore the use of a voltage-controlled oscillator that is phase-locked to the output of the circuit used to sense the resulting oscillation requires that a constant phase relationship is maintained between the two signals. Accordingly a feedback loop must be used that seeks to null the phase error at all times. Even if this is possible in principle, the voltage noise that is inevitably superimposed upon the signal that controls the voltage-controlled oscillator causes its frequency to vary randomly resulting in unwelcome phase noise.

When the positive feedback in such a system is configured such that it has a loop gain >1 over a limited frequency range (where only the desired $n\theta$ mode lies within that range), one or more forcers may be employed to selectively stimulate the $n\theta$ mode and one or more sensing elements may be employed to detect the motion. In this case the forcers and sensing elements would typically be distributed integer multiples of $\pi/n$ around the oscillatory member for the primary mode. Similarly forcers and sensing elements associated with the secondary mode would typically be distributed at integer multiples of $\pi/n$ but offset by $\pi/2n$ relative to the primary mode. The forcers preferably apply forces substantially normally to the inner or outer surface(s) of the oscillatory member.

The output signal of the sensing means may represent either the displacement of the oscillatory member or the rate of change of the displacement of the oscillatory member.

In an alternative embodiment the forcing means comprises n (where $n \geq 2$, even) forcers for applying substantially equal and opposite forces to opposite sides of the oscillatory member about an axis of symmetry of the oscillatory member to preferentially stimulate a translational mode.

According to a second aspect of the present invention there is provided a micro-electromechanical system (MEMS) comprising a substrate incorporating an oscillatory member, forcing means for driving the oscillatory member into resonance, and electrical sensing means providing an electrical output signal dependent on oscillation of the oscillatory member as a result of such forcing and any externally applied force, wherein the forcing means comprises n (where $n \geq 2$) forcers for applying substantially equal forces to the oscillatory member at points which are distributed at angular intervals of $2\pi/n$ radians around the oscillatory member.

The use of such a forcing arrangement is advantageous in enabling a sub-set of the various resonant modes of the oscillatory member to be stimulated. Specifically, where the forcers apply forces of substantially equal magnitude to the oscillatory member, a flexural mode $m.n\theta$ (where $n \geq 2$, $m \geq 1$ and n and m are integers) is preferentially stimulated in preference to a translational mode as the net translational force in any direction is substantially zero. Typically the system is arranged to ensure that the lowest order flexural mode is preferentially stimulated in operation of the system, this being done by suitable choice of a high Q, spring arrangement and frequency selection in the feedback circuit (loop gain/phase). In the case of n=2, the $2\theta$ mode (and the integer multiple higher order modes, i.e. $4\theta$, $6\theta$, $8\theta$, etc.) may be stimulated by employing two forcers which are diametrically opposite one another along a first line of symmetry of the oscillatory member (typically a suspended ring). Such a forcing arrangement can advantageously be used whether or not positive feedback is used to sustain oscillation.

Where n forcers are arranged as indicated to apply substantially equal forces to the oscillatory member such that the net translational force is substantially zero, the sensing means preferably comprises p sensing elements (where p is an integer $\geq 1$) for sensing oscillation of the oscillatory member at p points which are optimally offset by an angular rotation of $\pi/n$ radians relative to the forcers and, if there is more than one sensing element, are distributed at angular intervals of $2\pi/p$ radians around the oscillatory member. As a result the phase of the signal obtained at the output of the sensing means depends upon the order (mn) of the mode.

Non-optimal spacing of the sensing elements or a split electrode configuration about the optimal spacing may still allow the correct mode to be stimulated. However, the loop gain may be degraded with respect to other potential vibration modes and/or the sustaining feedback loop complexity increased. Any cyclo-asymmetry may additionally induce mode splitting, degrading performance.

A result of the angular offset of the sensing elements relative to the forcers, the signal obtained will be either substantially in phase with the forcers or substantially anti-phase with respect to the forcers at any given sensing element. The provision of one or more sensing elements enables the phase information of the sensing signal relative to the forcers to be determined, and thus a smaller sub-set of the flexural resonant modes may be selectively stimulated by employing positive feedback. This results in either odd or even integer multiples (m) of the lowest order mode ($n\theta$) being selectively stimulated. In other words, the phase information is employed in a positive feedback loop that is configured such that the loop gain for the $m.n\theta$ (n>2, m odd) mode is real and positive, whilst the loop gain for the $m.n\theta$ (n>2, m even) mode is also real but negative, or vice versa. For example, the positive feedback loop may be configured so that the loop gain for the $2\theta$ (n=2, m=1) mode is real and positive (>1), whilst the loop gain for the $4\theta$ (n=2, m=2) mode is real but negative (<1).

In a ring gyroscope, for example, the sensing elements for the secondary mode (rate of turn signal) in the gyroscope are preferably at $2\pi/n$ radian intervals but offset by an angular rotation of $\pi/2n$ radians relative to the forcers so as to be centred at nodes in the forced mode. Similarly, the forcers should be centred at nodes in the secondary mode and therefore should not stimulate the secondary mode.

The oscillatory member can be selectively stimulated without necessarily using frequency selective elements in the feedback loop employed to sustain oscillation, since the combined use of n distributed forcers and one or more oscillation sensing elements that sense oscillation mid-way between the points at which the forces are applied inherently provides a high degree of selectivity.

Preferably the positive feedback circuit incorporates phase shifting means for phase shifting the output signal of the sensing means to provide a feedback signal which sustains oscillation of the oscillatory member. Since the displacement due to oscillation varies sinusoidally at the resonant frequency of the mode stimulated and the velocity analogue required can be obtained merely by introducing a phase lead of 90° at this frequency, there is no need to use a differentiator circuit to produce the velocity analogue required to sustain oscillation. The phase lead introduced need only be 90° over the narrow frequency range of interest in order to have this effect. Furthermore introducing a phase lag of 90° at the resonant frequency of the mode required and reversing the polarity of the signal would be equally effective.

Most preferably the phase shifting means incorporates an all-pass filter for introducing a frequency dependent phase shift to sustain oscillation of the oscillatory member. The frequency dependent phase shift introduced by this all-pass filter provides additional selectivity, since its time constant can be adjusted so that the phase shift that it introduces is only equal to the optimum value of 90° at the resonant frequency of the mode required. This effectively weights the real parts of the loop gains for the resonant modes that can be stimulated in favour of the mode required. In addition the essentially constant gain magnitude of the all-pass filter results in no adverse weighting of its output noise spectrum.

Alternatively, where certain other capacitive sensing techniques, such as the measurement of the rate of change of displacement (as opposed to the measurement of the absolute displacement described above), for example using a transimpedance amplifier, a phase shift is inherent in the measurement process itself and thus a separate phase shift in the positive feedback loop may no longer be required.

In order that the invention may be more fully understood, preferred embodiments of the invention will now be described, by way of example, with reference to the accompanying drawings, in which.

The following description is given with reference to a self-resonant oscillatory MEMS ring gyrometer in accordance with the invention. However it will be appreciated that the invention is also applicable to other MEMS structures where the suspended mass is required to resonate in a given mode, particularly to oscillating structures with one or more axes of symmetry. In particular the invention is applicable to any type of vibratory gyroscopic structure. Furthermore, whilst the following description will be given with reference to an arrangement in which forcing and sensing are based on electrostatic techniques, other standard forcing and sensing mechanisms may be used within the scope of the invention, such as such mechanisms based on electro-inductive, piezoelectric, piezoresitive and electrothermal techniques.

Figure 1:
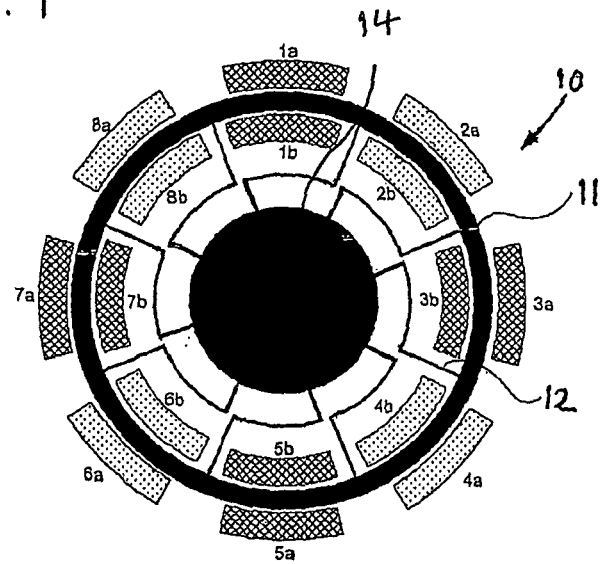
FIG. 1 is a diagram illustrating a self-resonant oscillatory MEMS ring gyrometer system in accordance with the invention.

Referring to FIG. 1 the ring gyrometer 10 incorporates an electrically conductive suspended ring 11 supported by eight suspensory ligaments 12 at 45° intervals around the ring 11, the ligaments being connected to a central hub 14. Alternative suspension mechanisms (e.g. internal with eight pairs of ligaments as shown in WO 00/16041) may also be employed, although details of this suspension mechanism are not important to this invention. Eight electrode pairs, 1a, 1b; 2a, 2b; 3a, 3b; 4a, 4b; 5a, 5b; 6a, 6b; 7a, 7b; and 8a, 8b are distributed at equal distances around the ring 11 such that one electrode (b) of each pair is positioned immediately inside the ring 11 and the other electrode (a) of each pair is positioned immediately outside the ring 11 opposite the one electrode (b).

Each electrode of each pair therefore forms one plate of a capacitor with the ring, the two capacitors formed by the two electrodes of each pair having capacitances which vary in dependence on the radial positioning of the adjacent part of the ring 11 extending between the electrodes. It is worth noting that the circumferential lengths of the electrodes should be equal to result in equal capacitances with respect to the ring and, that the areas of the electrodes should be equal to have the same parasitic capacitances relative to the substrate, enabling improved common mode reduction of electrical feedthrough in differential configurations.

In this example the electrode pairs 1a, 1b and 5a, 5b serve as drive or forcer elements for causing the ring 11 to oscillate, and the pair of electrodes 3a, 3b or 7a, 7b serve as sensing elements for providing an electrical output signal dependent on the oscillation of the ring 11. The ring 11 and its ligaments 12 may be formed by a fabrication method in which deep etching is used to free the suspended parts from the surrounding material of the wafer as described in WO 00/16041. The other electrodes 2a, 2b, 4a, 4b, 6a, 6b and 8a, 8b may be used for one or more ancillary functions, for example for a secondary system provided to check the frequency of both systems, in which case two pairs of these electrodes may be used to stimulate the secondary system and one or two pairs may be used to sense the secondary system signal. Having the same electrode arrangement on the primary as on the secondary results in equal damping on both the secondary system and the primary system. It also makes them interchangable. This also allows different biasing to be applied to the primary and secondary systems if required for electrostatic tuning or biasing to be applied within either the primary system or the secondary system to balance (rotate) the mode. Pairs of these electrodes may also be used to operate in a closed loop mode to maintain "zero" signal on the secondary by feeding back a portion of the primary signal.

Figure 3:
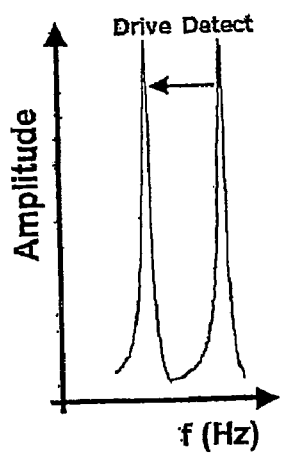
FIG. 3 is a graph illustrating the primary and secondary mode responses in such a system.

Such a system is arranged to have a primary mechanical mode, preferably the 2θ mode, in which it is stimulated to oscillate by a voltage-controlled oscillator applying an alternating radial force to the ring 11 at one or more points about its circumference. In the illustrated example electrostatic forces are used for this purpose. In the event of an external force being applied to the system, the secondary mechanical mode of the ring 11 is excited, and the output signal obtained by sensing of the resulting oscillation of the secondary mechanical mode is provided as an indication of the applied external force. As will be described more fully below, the ring 11 is stimulated to oscillate at the resonant frequency of its 2θ mode by applying a feedback signal from the sensing output to the circuit for energising the forcer elements. FIG. 3 denotes the primary (drive) mode response and the secondary (detect) mode response for a ring gyrometer as a function of frequency, f. For maximum sensitivity these response curves should overlap significantly (but should not be exactly matched to preserve bandwidth).

Figure 2:
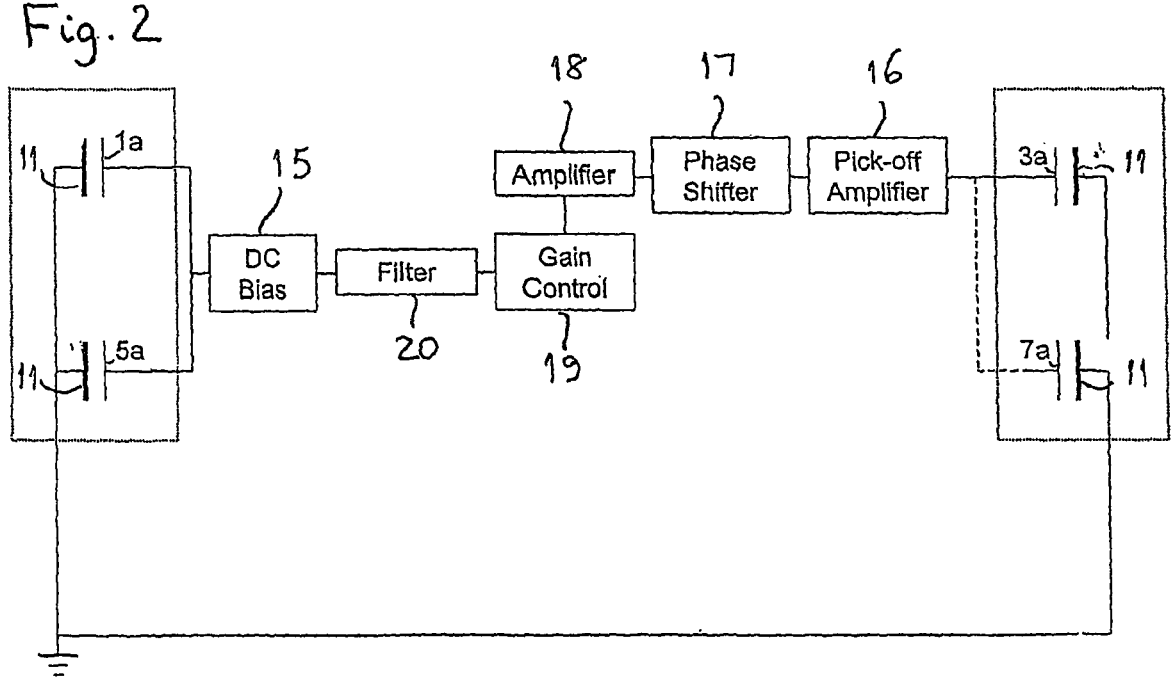
FIG. 2 is a diagram of a drive circuit for use in the system of FIG. 1.
Figure 4:
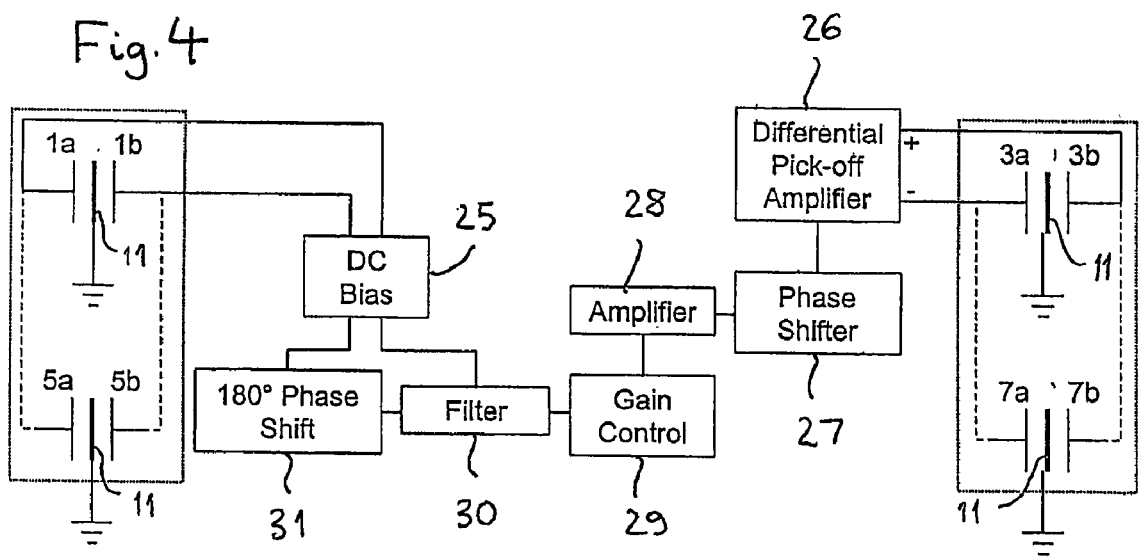
FIG. 4 is a diagram of an alternative drive circuit for use in the system of FIG. 1.

FIGS. 2 and 4 show alternative circuit arrangements which may be used for driving such a system. In the case of the circuit arrangement of FIG. 2, only the outer forcing and sensing electrodes are used, and the ring 11 is connected to ground so that the capacitance which is detected in each case is that between the outer electrode and the ring which varies as a function of the position of the adjacent portion of the ring 11 relative to the outer electrode. More particularly the outer electrodes 1a and 5a of the diametrically opposing forcers are connected to a dc bias circuit 15, and superimposed ac voltages are applied to the electrodes 1a and 5a in order to stimulate oscillation of the ring 11 in the 2θ mode (assuming that the drive voltages are in phase). The resulting secondary oscillation due to coupling of the primary oscillation with any externally applied force is sensed at the diametrically opposing sensing electrodes 3a and/or 7a which are located at points 90° around the circumference of the ring 11 relative to the forcer electrodes 1a and 5a.

The sensing electrodes 3a and 7a are coupled to a pick-off amplifier 16 constituting an oscillation sensing circuit, and the amplifier 16 supplies can output signal which is a function of the displacement function of the ring (due to applied force). The amplifier 16 is connected to a phase shifting circuit 17 that provides the appropriate phase of signal to be fed back to the forcer electrodes 1a and 5a to sustain the desired oscillation. The signal of the required phase is next amplified by the amplifier 18 to provide a sufficient level of ac signal to drive the forcer electrodes 1a and 5a. Optionally the amplifier 18 could comprise a high gain precision clipper to generate substantially a square wave ac signal.

In most embodiments, it is preferred to control the level of the ac signal and hence the magnitude of the primary oscillation, and a gain control circuit 19 is necessary. This may be as simple as a potentiometer but in many cases is an active circuit (monitoring the magnitude of the primary oscillation and adjusting the attenuation level to keep it constant) to improve the linearity of the rate of turn response, for example by preventing primary dip as energy is coupled into the secondary mechanical system or corrections for change in Q with changes in pressure. Finally a filter 20 may be employed to ensure that the desired resonant mode is excited. For example, a bandpass filter could be employed to ensure that only a certain range of frequencies is excited. As discussed earlier, where an all pass filter is employed, this performs both the phase shifting function and the frequency filtering function. However, it may still be desirable to incorporate a high pass filter 20 to reduce noise.

In the alternative circuit arrangement of FIG. 4, the ring 11 is again connected to ground, but differential voltages are applied to the outer and inner forcer electrodes 1a, 1b and 5a, 5b by way of a dc bias circuit 25 in order to stimulate oscillation of the ring 11 in its primary oscillation mode. Furthermore the signals detected by the outer and inner sensing electrodes 3a, 3b and 7a, 7b at locations 90° around the circumference of the ring 11 relative to the forcer electrodes 1a, 1b and 5a, 5b are supplied to differential inputs of a differential pick-off amplifier 26 constituting the oscillation sensing circuit. This has the added advantage of rejecting any unwanted common mode signals, such as feedthrough. The component blocks 27, 28, 29 and 30 perform essentially the same functions as the corresponding component blocks 17, 18, 19 and 20 of FIG. 2, except that pairs of forcer electrode are used in the case of the embodiment of FIG. 4 to excite the motion requiring opposite phases of the ac signal. Thus an additional phase shifting block 31 is required to generate an antiphase signal for the electrodes 1b and/or 5b to the signal applied to the electrodes 1a and/or 5a.

Such a symmetric arrangement of the forcer electrodes reduces any translational component being superimposed on the primary motion (albeit suppressed by a factor of the $Q_{n\theta}$ relative to the desired $n\theta$ mode where the translational component is not mechanically amplified by the properties of the resonator). This can appear as an error term in the secondary system but may be rejected to a first order by using more than one set of sensing electrodes where each set of sensing electrodes comprises electrodes on opposite sides of the ring with the ring passing between them (preferably in the plane of the vibratory motion, although the electrodes could also be arranged out of the plane, that is above and below the plane). Such a symmetric arrangement is similarly advantageous when the system is operated in closed loop feedback as any translational force is similarly suppressed.

Alternative circuit arrangements may be used in which the electrodes are connected to ground and bias voltages are applied to the ring, or in which an ac modulation carrier signal is applied to the ring.

In the above described arrangements a dc bias is used to reduce the ac drive voltage required to drive the forcer electrodes, and thus to reduce any unwanted feedthrough of the drive signal to the sensed signal or to increase the sensed signal magnitude. In this case the force F exerted by the forcer electrode on the ring is proportional to $V^{ac2}+2V_{ac}V_{dc}+V_{dc}^2$ where $V_{ac}$ is the ac voltage applied to the electrode and $V_{dc}$ is the dc voltage applied to the electrode. If the ac voltage has a frequency of f, then the forcer electrode will excite the ring at a frequency of 2f where no dc voltage is present, but at frequencies of both f and 2f where a dc voltage is also present. It is therefore important that care is taken to stimulate the desired resonance mode of the ring when dc and ac voltages are both present by appropriate selection of the relative magnitudes of the dc and ac voltages (and the transfer function of the feedback circuit when operated in self-resonance). An alternative to using a dc bias on the sensing electrodes is to ground the electrodes and suitably bias the ring or to employ a high frequency ac modulation signal, of a frequency of 200 kHz for example, so that the sensed frequency is far removed from 1/f noise at low frequencies and the effect of such noise is reduced. However this alternative an additional demodulation stage.

It should be noted that the order of the component blocks within the feedback loop do not necessarily have to be as described above. For example, as an alternative, the phase shift could be the last step prior to adding the dc bias. Similarly, the split into a phase forcer signal and an antiphase forcer signal could be effected earlier in the loop (for example prior to the gain control in which case a gain control block would then be required in each arm). Another alternative would be to employ a frequency divider (÷2) in place of the dc biasing circuit in the feedback loop to provide a pure ac drive system. Also, if ac modulation were used, a demodulation stage (within the pick-off stage) would be required to recover the ring response signal prior to going through the remainder of the loop.

In both these alternatives the feedback signal serves to sustain the oscillation of the primary mechanical system which preferentially oscillates at its resonant frequency, even if the magnitude of the loop gain is larger at a different frequency. However the sensitivity of the oscillation sensing circuit realised when a transresistance amplifier is used to produce the velocity analogue required to sustain oscillation of the primary and mechanical system is proportional to frequency, since it is driven from a capacitative current source. This is undesirable because it effectively weights the loop gains for the various resonant modes in an unfavourable way. It is for this reason that the output of the sensing circuit, which senses the displacement of the ring 11 relative to the electrodes 3a, 3b and 7a, 7b, is phase shifted by the phase shifter 17 or 21. Since the displacement due to oscillation varies sinusoidally at the resonant frequency of the mode stimulated, it is sufficient to introduce a phase lead of 90° at this frequency, and there is no need to use a differentiator circuit to produce the required signal because the phase lead introduced need only be 90° over the narrow frequency range of interest. Alternatively a phase lag of 90° may be introduced at the required frequency, and reversal of the polarity of the signal applied.

The experimental system used to establish that self-resonant oscillation of the system in this manner is practical included a sustaining loop employing an all-pass filter to introduce the 90° phase shift required, with the time constant being adjustable as necessary. In this arrangement high pass filters were used to attenuate both the telegraph noise and the flicker noise introduced by the sensing circuit, and low pass filters were used as a result of the limited gain-bandwidth products of the amplifiers used. The effect of these additional filters upon the overall phase shift introduced within the sustaining loop was minimal and could be adjusted for by adjustment of the time constant of the all-pass filter. Furthermore a precision clipper circuit was employed to control the amplitude of oscillation, the loop gain exceeding the value required to sustain oscillation when the clipper circuit was inactive. On the clipper circuit becoming active, the loop gain was automatically reduced to the value required to maintain constant amplitude oscillation.

The self-resonant oscillator realised in this manner always started up without assistance, provided that the loop gain when the clipper circuit was inactive was sufficiently large. The broadband noise produced by the amplifiers within the sustaining loop was large enough to initiate oscillation, and the noise was rapidly shaped by the response of the mechanical system as the self-resonant oscillation became established.

The resonant frequency will automatically track with temperature as the ring itself is the dominant frequency determining element in the positive feedback loop. It was also found in such systems that the frequency of oscillation sustained by positive feedback was relatively insensitive to small variations in the phase shift introduced within the sustaining loop. This property was attributed to the natural tendency of the system to preferentially oscillate at the frequency that maximises the energy transferred due to oscillation. The phase shift introduced was optimised by adjusting it so that the amplitude of the output from the sensing circuit was maximised for a given forcer drive signal amplitude. In such a system the self-resonant oscillation can be more rapidly initiated by applying an impulse to the input of the forcer drive circuit, this impulse acting in the manner of the plucking of a string of a stringed instrument. The resulting force applied to the ring excites all the resonant modes that can be stimulated, and the inherent selectivity of the sustaining loop then ensures that oscillation is sustained in the mode required whilst oscillation in all other modes decays.

In a development of the invention in which the system is caused to resonate when the phase shift around the path is 0 (360) degrees, adjustment of the phase shift applied to the sensed signal (i.e. deliberately detuning the loop, more specifically in the range ±10 degrees from the phase giving optimal amplitude) can be used to effect fine adjustments, for example of the order of 10 Hz, of the frequency at which the excited mode resonates. This represents an additional mechanism for tuning of the resonant modes that is typically accomplished using the established techniques of either electrostatic tuning, as disclosed by M. E. McNie, J. S. Burdess, A. J. Harris, J. Hedley and M. Young, "High aspect ratio ring gyroscopes fabricated in [100] silicon on insulator material", IEEE International Conference on Solid State Sensors and Actuators (Transducer '99), Sendai (Japan), Jun. 1999, Vol.2, pp. 1590–1593, or mechanical trimming, as disclosed by GB 2292609A. This fine tuning of primary drive frequency enables improved matching to secondary frequency (where a split has been caused by manufacturing tolerances) for improved response and/or precise definition of bandwidth.

The induced phase shift in the feedback path will result in some variation in the amplitude of the motion stimulated in the mechanical element, so that some form of automatic gain control (AGC), for example by adjustment of the clipping level or using a sigma-delta scheme, may be necessary to ensure device-device drive amplitude uniformity. An added benefit of AGC is that as energy is coupled from the primary (driven) mechanical system into the secondary mechanical system via the Coriolis force under an applied rate of turn, the amplitude of the primary resonance is maintained and the scale factor does not dip.

The above-described systems employing positive feedback in order to sustain oscillation of the primary mechanical system are advantageous in that they produce less phase noise than conventional systems utilising a phase-lock loop circuit to sustain oscillation. This is because such systems utilising positive feedback have a natural tendency to preferentially oscillate at their resonant frequency, whereas the use of an external oscillatory drive system at a particular frequency does not allow this to happen. Furthermore use of a voltage controlled oscillator that is phase-locked to the output of the sensing circuit requires that a constant phase relationship is maintained between the two signals. Even if it is possible in principle to null the phase error at all times, the voltage noise inevitably superimposed upon the signal controlling the voltage controlled oscillator in such a phase-lock loop arrangement causes slight, random frequency variation resulting in phase noise.

The invention claimed is:

1. A micro-electromechanical system (MEMS) comprising:
   a substrate incorporating an oscillatory member;
   forcing means for driving the oscillatory member into resonance;
   electrical sensing means for providing an electrical output signal dependent on oscillation of the oscillatory member as a result of such forcing and any externally applied force, and
   a positive feedback circuit dependent on the output signal of the sensing means for feeding back a signal to the forcing means in order to sustain oscillation of the oscillatory member, wherein the forcing means comprises n (where n is an integer and n≧2) forcers for applying forces of substantially equal magnitude to the oscillatory member at points which are distributed at angular intervals of $2\pi/n$ radians around the oscillatory member to preferentially stimulate a flexural mode.

2. A system according to claim 1, wherein the forcing means includes two forcers for applying substantially equal forces to the oscillatory member at two points which are diametrically opposite one another along a first axis of symmetry of the oscillatory member.

3. A system according to claim 2, wherein the two forcers are arranged to apply substantially equal forces to the oscillatory member acting in opposite directions at said points.

4. A system according to claim 1, wherein the sensing means comprises p sensing elements (where p is an integer and p is ≧1) for sensing oscillation of the oscillatory member at p points which are offset by an angular rotation of $\pi/n$ relative to the forcers.

5. A system according to claim 4, wherein the sensing means comprises a plurality of sensing elements distributed at angular intervals of $2\pi/p$ radians around the oscillatory member.

6. A system according to claim 1, wherein the forcing means and/or the sensing means comprises at least one pair of electrodes with each electrode of the pair being provided on a respective side of the oscillatory member and forming a variable capacitance with the oscillatory member, the two electrodes being of substantially the same length.

7. A system according to claim 1, wherein the positive feedback circuit incorporates phase shifting means for phase shifting the output signal of the sensing means to provide a feedback signal which sustains oscillation of the oscillatory member.

8. A system according to claim 7, wherein the phase shifting means is adapted to apply a phase shift which is adjustable to maximise the output signal of the sensing means for a given forcing amplitude.

9. A system according to claim 7, wherein the phase shifting means is adjustable to vary the phase of the signal applied to the forcing means in order to provide fine adjustment of the frequency at which the oscillatory member is caused to oscillate.

10. A system according to claim 1, wherein the positive feedback circuit does not include any frequency selective components other than the sensing means and the oscillatory member itself.

11. A system according to claim 1, wherein the positive feedback circuit incorporates filter means for filtering the signal fed back to the forcing means.

12. A system according to claim 11, wherein the filter means incorporates an all-pass filter for introducing a frequency dependent phase shift to sustain oscillation of the oscillatory member.

13. A system according to claim 11, wherein the filter means incorporates a high-pass filter for attenuating induced noise.

14. A system according to claim 1, wherein the oscillatory member is a suspended mass, such as a suspended ring.

15. A system according to claim 1, wherein the forcing means incorporates oscillation initiating means for applying an initial impulse to the oscillatory member to initiate oscillation of the oscillatory member.

16. A method according to claim 1, wherein the sensing means incorporates a synchronous demodulator for demodulating the sensed signal on the basis of a carrier signal.

17. A micro-electromechanical system (MEMS), said system comprising:
   a substrate incorporating an oscillatory member,
   forcing means for driving the oscillatory member into resonance, and
   electrical sensing means providing an electrical output signal dependent on oscillation of the oscillatory member as a result of such forcing and any externally applied force, wherein the forcing means comprises n (where n is an integer and $n \geq 2$) forcers for applying substantially equal forces to the oscillatory member at points which distributed at angular intervals of $2\pi/n$ radians around the oscillatory member.

18. A system according to claim 17, wherein the forcing means comprises two forcers arranged to apply substantially equal forces to the oscillatory member at points along a first axis of symmetry of the oscillatory member.

19. A system according to claim 18, wherein the sensing means comprises two sensing elements for sensing oscillation of the oscillatory member at two points which are diametrically opposite one another along a second axis of symmetry of the oscillatory member substantially perpendicular to the first axis of symmetry.

20. A system according to claim 1, where the oscillatory member supports two orthogonal resonant modes of substantially equal frequencies such that any coupling between modes is mechanically amplified.

21. A system according to claim 1, which is a self-resonant oscillatory ring gyrometer.

22. A system according to claim 1, wherein the oscillatory member is dimensioned such that it has two orthogonal modes of vibration that are closely matched in frequency.

23. A system according to claim 1, wherein the forcing means is used in a closed loop feedback system to suppress a flexural mode of the oscillatory member.

* * * * *